June 25, 1946.  E. I. STEARNS ET AL  2,402,786
CAMOUFLAGE DETECTION
Filed Feb. 19, 1942  2 Sheets-Sheet 1
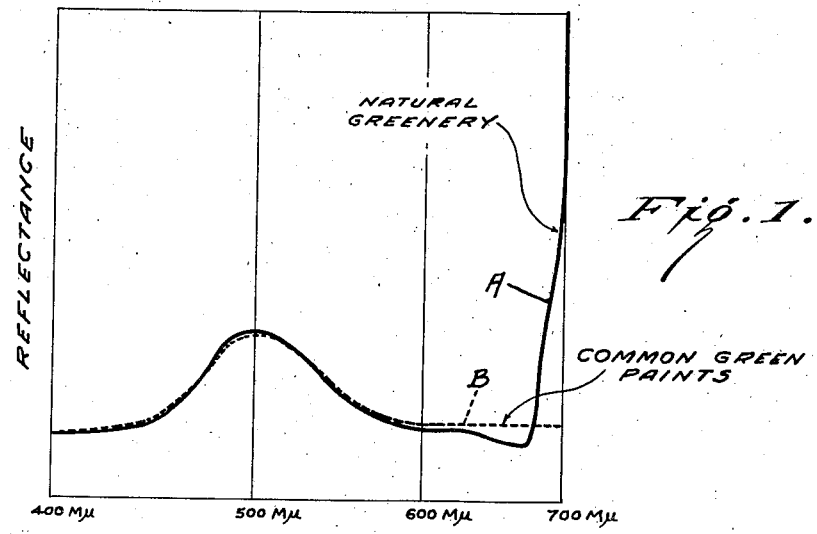
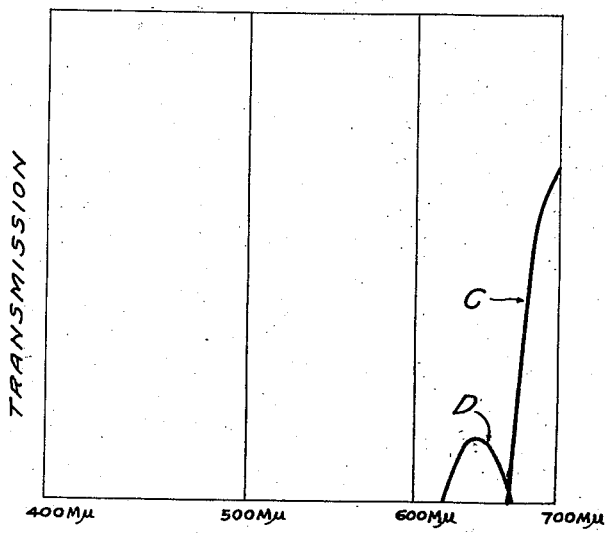
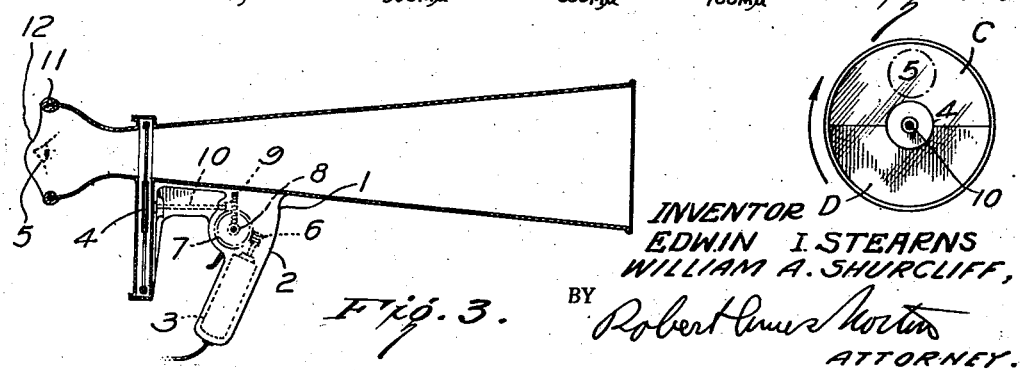
INVENTOR
EDWIN I. STEARNS
WILLIAM A. SHURCLIFF,
BY Robert Cur Morton
ATTORNEY.

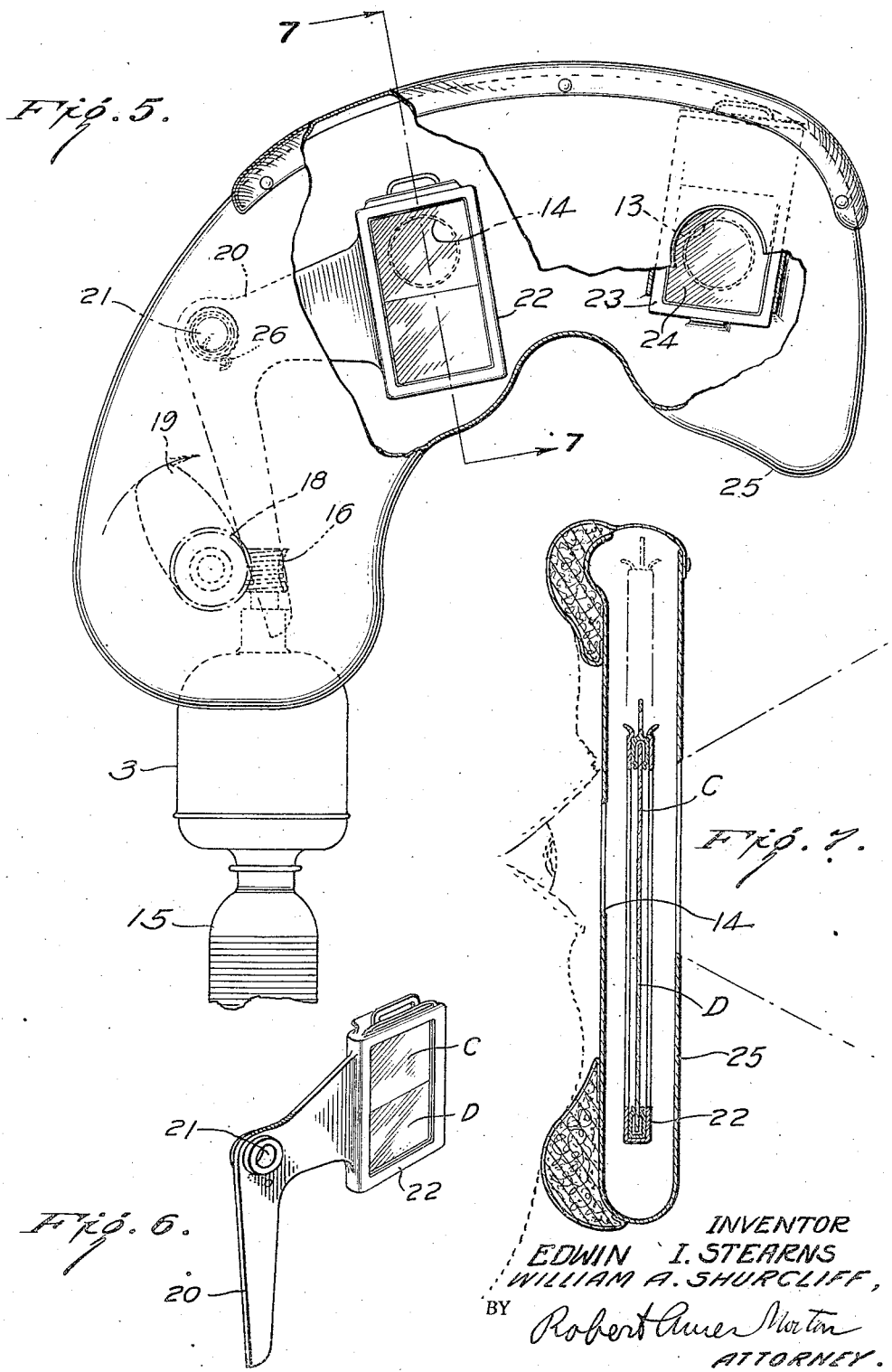

Patented June 25, 1946

2,402,786

UNITED STATES PATENT OFFICE 2,402,786

CAMOUFLAGE DETECTION

Edwin I. Stearns, North Plainfield, and William A. Shurcliff, Plainfield, N. J., assignors to American Cyanamid Company, New York, N. Y., a corporation of Maine Application February 19, 1942, Serial No. 431,484

6 Claims. (Cl. 88—14)

This invention relates to a method and apparatus for distinguishing between natural greenery and artificially simulated greenery using ordinary green paints.

The simulation of color of natural greenery is an important factor in military tactics. The use of painted or dyed material to simulate natural green in order to camouflage gun emplacements, parked airplanes and the like has been used very extensively. When viewed from a great height ordinary green camouflage is a perfect visual match and the aerial observer cannot visually detect the difference between the natural and artificial green. Various methods of detection have been proposed, involving infrared photography, based on the fact that the chlorophyll of natural green has a very high reflectance for infrared and for the visible red at the extreme end of the spectrum whereas ordinary green paints and dyes used for camouflage do not reflect highly in the near infrared or in the extreme visible red.

Photographic methods are open to serious disadvantages. In the first place, they require special equipment and in the second place, which is even more important, it is necessary for the observation plane to return and for the photographs to be developed and/or printed. This loss in time can be very serious, particularly in the camouflage of military equipment which does not remain for long in one place, for example the camouflage of airplanes on the ground at dispersion fields, mobile artillery, tanks and the like. A further serious disadvantage is the fact that for accurate photography the observation plane must move relatively steadily on a uniform course which renders it particularly vulnerable to anti-aircraft fire and also to attack by other planes. These disadvantages are not inherent in visual observation, and it is an object of the present invention to accomplish by visual observation what formerly required red or infrared photography.

The present invention provides a method and apparatus in which two filters are alternately interposed in the line of sight, the filters being capable of causing artificial greenery to flicker whereas natural greenery remains constant.

The invention will be described in greater detail in conjunction with specific modifications shown in the accompanying drawings in which:

Fig. 1 is a series of spectrophotometric reflectance curves for natural greens and common green paint;

Fig. 2 is a series of spectrophotometric transmission curves for the two filters;

Fig. 3 is a vertical section through a device for alternately interposing the filters of Fig. 2 in the line of sight;

Fig. 4 is a detailed elevation of the filter disc in Fig. 3;

Fig. 5 is an elevation partly broken away of a modified device for alternately interposing filters in the line of sight;

Fig. 6 is a detail of the filter holder in Fig. 5; and

Fig. 7 is the vertical section along the line 7—7 of Fig. 5.

It will be noted from an examination of Fig. 1 in which curve A corresponds to the spectrophotometric reflectance of chlorophyll and B to that of common green paints, that while an excellent match is obtained throughout most of the visual spectrum, in extreme red the curve of chlorophyll rises steeply to a high value in the near infrared whereas the reflectance of the common green paint remains low in this region.

According to the present invention two filters are alternately interposed in the line of sight. These are sharp cutting filters, the spectral response curves of which are shown in Fig. 2 at C and D. It will be noted that C transmits the dep red readily, but has a sharp cutoff at about 670 millimicrons, and D shows a high transmission near 650 millimicrons but drops almost to 0 at 670 millimicrons.

The two filters are conveniently mounted in a disc shown in Fig. 4 which is provided with shaft 10 turned through suitable reduction gearing by the motor 3 which may be of electric or spring design. The filter disc turns in a housing provided with a suitably shaped opening 12 for the eye so arranged that extraneous light is excluded.

In practice the transmission curves of filters C and D are such that to the eye natural greenery viewed through either filter will appear to have the same brightness. Inasmuch as the sensitivity of the eye is much lower in the range transmitted by filter C than in the range covered by filter D, the latter will normally have to be denser. The disc containing the filter is rotated at a speed well below the persistence of vision, for example about one revolution per second, and natural greenery will then appear to be of uniform brightness, and of course of a deep red color. Any common green paint or other green camouflage will appear as bright through the D filter as natural greenery, but will be very dull through the C filter and accordingly when the filters are rotated through the line of sight the artificial green camouflage will appear to flicker in intensity while retaining substantially the same shade.

It is usually desirable for the observer to examine the ground from time to time in its natural color and for this purpose the observer may use suitable neutral filters such as gray filters or crossed polarizing filters in order to reduce the intensity. Otherwise the eye will be blinded because the light coming through the rotating filters is of course much less bright than the subject viewed without any filter at all.

In the device shown in Figs. 3 and 4 a suitable housing 1 is supported by a hollow handle 2 carrying a motor 3 which rotates a disc 4 provided with two filters C and D (see Fig. 4) so that the filters are alternately interposed in the line of sight from the eye shown at 5. The rotation of the disc is effected through a double reduction worm gear, the worm 6 being driven by the motor and turning a worm gear 7 which in turn carries a worm 8 turning a worm gear 9 keyed to the shaft 10 of the disc 4. A suitable cushioned opening 11 is provided so that extraneous light is excluded from the eye. The rotation of the disc is at a rate below that of the persistence of vision and for practical purposes a speed of rotation of about 1 revolution per second is usually satisfactory.

Figs. 5 to 7 show a modified device which is a preferred modification as it permits a much wider field of view than the modification of Figs. 3 and 4. In this modification a hollow body 25 is provided with two openings 13 and 14 for the eyes and is held against the forehead of the observer so as to resemble a pair of goggles. One side of the body is extended downwardly to form a handle 15 containing the driving motor 3 which drives the worm 16 in a manner similar to that of Fig. 3. The worm in turn meshes with the worm wheel 18 which turns a cam 19. The cam bears on an L shaped member 20 which is pivoted at 21 and operates as a bell crank against the tension of the spring 26. The opposite arm of the member 20 carries a hollow filter holder 22 in which is placed a double filter C and D. (See Figs. 6 and 7.) The filters correspond to filters C and D of the modification shown in Figs. 3 and 4.

Rotation of the wheel 18 with the cam 19 is preferably at the rate of about 1 revolution per second and the cam causes the member 20 to oscillate at the same rate so that filters C and D are alternately interposed in the line of sight through the eye opening 14.

The portion of the frame work 25 in front of the opening 13 is provided with a stationary filter holder 23 in which a suitable gray filter 24 is placed so that when observing natural greenery the scene appears equally bright to both eyes.

The present invention is not limited to particular structural details shown in the drawings which illustrate merely two suitable mechanical devices for alternately interposing the filters in the line of sight and other modified devices may be constructed within the scope of the invention. Thus for example instead of holding the device of Figs. 5 to 7 in the hand, it may be fastened to the head or to a suitable helmet by any ordinary type of fastening.

By means of the present invention an aerial observer can tell at once the location of artificial green camouflage and can report immediately by radio so that there will be no delay between the observation and the relaying of information. The device of the present invention is relatively light, can be shifted quickly so that the observer may view different areas on the ground with the same facility as with a pair of binoculars, and it is not necessary for a plane to fly on a constant steady course in order to give the observer the opportunity to make an observation, which is an important advantage over any photographic method as it does not subject the observing plane to as great danger from anti-aircraft fire or even from other airplanes.

The filter arrangement described above results in the natural green remaining constant in intensity while the artificial green flickers. The type of artificial green referred to in the specific description is one which has a very low reflectance in the deep red. The result is that through the C filter it appears dimmer than through the D filter. In other words, it flickers down from the brightness level of the natural green. There have been proposed green colors in which a considerable amount of material is added having a high degree of reflectance in the red and this may in many cases result in the artificial green appearing brighter than the natural green through filter D. In such a case, the natural green again stays constant in intensity but the artificial green would flicker up from the brightness level of the natural green instead of down.

In observing landscapes for military camouflage, it is usually desirable to have the natural green stay constant and the artificial green flicker because the artificial green represents a smaller proportion of the landscape and it is less fatiguing to the eye to have only smaller portions of the landscape flicker than to have the major portion flicker. For some purposes, however, it may be desirable to use the reverse procedure, that is to have some artificial green colors remain constant in shade and have the natural green flicker. In such a case, it is only necessary to choose the densities of filters C and D so that a particular artificial green will appear equally bright through both filters whereas the natural green will appear unequally bright. The operation of this modification of the present invention is, of course, mechanically the same as the preferred modification described in detail above, the only difference lying in the choice of filter densities.

We claim:

1. A method of visual distinction between green vegetation and common green paints which match in the green portion of the visible spectrum which comprises alternately viewing the same landscape through two filters which are alternately interposed in the line of sight, one transmitting light from about 670 millimicrons to the red end of the visible spectrum and the second light from about 625 millimicrons to about 670 millimicrons and having a transmission peak at about 650 millimicrons, the alternation being at a rate slower than the integration time for the eye but fast enough to permit flickering and the filter densities being so chosen that one of the two greens appears of the same brightness through either filter.

2. A method of visual distinction between green vegetation and common green paints which match in the green portion of the visible spectrum which comprises alternately viewing the same landscape through two filters which are alternately interposed in the line of sight, one transmitting light from about 670 millimicrons to the red end of the visible spectrum and the second light from about 625 millimicrons to about 670 millimicrons and having a transmission peak at about 650 millimicrons, the alternation being at a rate slower than the integration time for the eye but fast enough to permit flickering and the filter densities being so chosen that natural green foliage appears of the same brightness through either filter.

3. A device for detecting the difference between green foliage and green paints comprising in combination a viewing device having an opening for the eye and means for preventing stray light from striking the eye, two filters in said device, one transmitting light from about 670 millimicrons to the red end of the visible spectrum and the other transmitting light from about 625 to 670 millimicrons and having a transmission peak at about 650 millimicrons, the filters being of such densities that natural green appears of the same brightness when observed through either filter and means associated with the viewing device and filters for alternately interposing said filters in the line of sight in said viewing device at a rate of alternation below the persistence of vision, but fast enough to permit flickering.

4. A device according to claim 3 in which the means for interposing the filters in the line of sight consists in a rotatable disc on which the filters are mounted and means to rotate the disc at a rate to cause alternate interposition of the filters in the line of sight at a rate lower than the persistence of vision, but fast enough to permit flickering.

5. A device according to claim 3 in which the means for interposing the filters in the line of sight consists in an oscillating member on which the filters are mounted and means to oscillate the same to alternately interpose the filters in the line of sight at a rate lower than the persistence of vision, but fast enough to permit flickering.

6. A device for detecting the difference between green foliage and green paints, comprising in combination a viewing device containing a framework fitting over the eyes and having an opening for each eye, a bell crank shaped member pivoted in said framework, one arm of said member carrying a filter holder provided with two filters, one transmitting light from about 670 millimicrons to the red end of the visible spectrum and the other transmitting light from about 625 to 670 millimicrons, and having a transmission peak at about 650 millimicrons, the filters being of such densities that natural green appears to be of the same brightness when observed through either filter, driving means coacting with the other arm of the bell crank shaped member and capable of causing the latter to oscillate through an arc such that the filters are alternately interposed in front of one eye opening, the driving means operating at a speed providing oscillations below the persistence of vision but fast enough to permit flickering and means for holding a third filter over the other eye opening.

EDWIN I. STEARNS.
WILLIAM A. SHURCLIFF.